3,277,069
POLYMERIZATION CATALYSTS CONTAINING TITANIUM TRICHLORIDE, ALKYL ALUMINUM DIHALIDES AND ONIUM HALIDES, AND PROCESS FOR PREPARING SAME
Giulio Natta, Adolfo Zambelli, Italo Pasquon, and Mario Farina, Milan, Italy, assignors to Montecatini Società Generale per l'Industria Mineraria e Chimica, Milan, Italy, a corporation of Italy
No Drawing. Filed June 26, 1961, Ser. No. 119,523
Claims priority, application Italy, July 1, 1960, 11,671/60
10 Claims. (Cl. 260—93.7)

The present invention relates to new catalytic systems and to a process for the stereospecific polymerization of alpha-olefins to high molecular weight isotactic polymers having a highly regular steric structure by means of said catalytic systems. Catalytic systems consisting essentially of crystalline transition metal halides, such as violet titanium trichloride and trialkyl aluminum compounds, dialkyl aluminum monohalides or dialkyl berillium compounds, are known and these catalyst systems make it possible to obtain high molecular weight crystalline polymers of alpha-olefins having an isotactic structure.

The activity of said catalytic systems, which are by themselves very stereospecific, can be increased by addition of suitable substances, such as soluble titanium compounds, ethers, amines, phosphines etc., or by the additions of small amounts (lower than 10% by mols based on the titanium trichloride) of onium halides, such as tetra-alkylammonium or tetra-alkylphosphonium iodides.

It has also been disclosed that high molecular weight polymers of alpha-olefins having a highly regular steric structure, a high content of isotactic macromolecules and high crystallinity can be obtained by using catalytic systems consisting essentially of violet titanium trichloride and monoalkyl aluminum dihalide, provided that monoalkyl aluminum dihalide is reacted in suitable ratios with suitable electron-donor compounds containing nitrogen, for example, compounds such as trialkylamines, pyridine, and alkylformamides. The advantages derived from using monoalkyl aluminum dihalides is evident since said compounds are less dangerous, and have a lower cost than trialkyl aluminum compounds or dialkyl aluminum monohalides.

It has now surprisingly been found that it is possible to obtain catalytic systems which are highly stereospecific for the polymerization of alpha-olefins.

These catalytic systems are produced by adding the reaction product obtained by contacting one mole of monoalkyl aluminum dihalide with 0.4 to 0.6 mol of an onium halide, to violet titanium trichloride (alpha, gamma modifications, see G. Natta, P. Corradini, G. Allegra, Rend. Acc. Naz. Lincei (8), 26, 155 (1959)—or other crystalline modifications, containing in solid solution another metal halide, e.g., aluminum trichloride).

Some examples of suitable onium halides are: tetraalkyl-ammonium halides such as tetra-butylammonium iodide and tetrabutyl ammonium bromide; tetraalkylphosphonium halides such as tetra-butyl-phosphonium iodide and tri-alkylsulfonium halides such as tri-methylsulfonium iodide. As can be seen, these componnds are very different from the above mentioned electron donor compounds.

The high stereospecificity of the catalytic compositions which are the object of the present invention is surprising. As demonstrated in the examples, catalysts which polymerize propylene to isotactic macromolecules and give, depending on the operating conditions, crude products having an intrinsic viscosity between 1 and 6 (measured in tetraline at 135° C.) and a residue, after extraction with boiling n-heptane, of between 94 and 100%, have been prepared, according to the present invention.

The crystallinity of the crude polymers and of the separate fractions when measured under X-rays (see G. Natta, P. Corradini, M. Cesari, Rend. Acc. Naz. Lincei (8) 22, 11 (1957)) is very high. In fact the polymers produced according to the present invention, generally possess higher crystallinities due to the presence of the isotactic structure than those polymer products which are produced at the same tempeartures using previously known catalytic systems.

The catalytic systems consisting essentially of transition metal halides and monoalkyl aluminum dihalides will not by themselves produce high polymers of alpha-olefins possessing the isotactic structure.

It is therefore evident to one skilled in the art that the present invention does not involve the achievement of a mere activity increase in these catalytic systems by the addition of onium halides thereto. On the contrary, the present invention provides completely new catalytic systems which produce a qualitative rather than only a quantitative variation in the polymerization process.

The catalytic systems consisting essentially of titanium trichloride and monoalkyl aluminum dihalides promote the propylene polymerization by means of a cationic mechanism and give oligomers having an irregular structure, whereas the same systems, wherein the monoalkyl aluminum dihalide has been modified by the addition of suitable amounts of an onium halide, promote the polymerization of alpha-olefins through a coordinate anionic mechanism and yield isotactic marcromolecules which are chemically and sterically regular. Thus, it is evident that the results obtained when employing the new catalytic systems of the present invention could not be foreseen.

The present invention resides not only in the fact that a monoalkyl aluminum dihalide is used in place of triethyl aluminum, dialkyl aluminum monohalide or alkyl aluminum sesquihalide, but also in the present discovery that the onium halide to monoalkyl aluminum dihalide ratio must be maintained within very narrow limit in order to achieve the desired results. In order to have a sufficiently high polymerization rate and a high percentage of isotactic polymer (not extractable with boiling n-heptane), it is necessary that the molar ratio of onium halide to monoalkyl aluminum dihalide be between 0.4 to 1 and 0.6 to 1.

When using ratios which move away from the optimum ratio (0.5 to 1), the catalyst activity and stereospecificity quickly decline.

For example, catalytic systems prepared with titanium trichloride and a ratio of onium halide to dialkyl aluminum mono-halide equal or higher than 0.7 to 1 are quite inactive in propylene polymerization. Upon working with ratios lower than 0.4 to 1, the polymerization is very slow and the crude polypropylene obtained contains high percentages of oligomers and amorphous solid polymers extractable with boiling ethyl ether.

The catalytic system of the present invention may be prepared by adding the components to the vessel in any suitable sequence.

An example of a preferred but not mandatory procedure for operating according to the present invention is as follows:

The onium salt is reacted with monoalkyl aluminum dihalide, at temperature comprised between —20° C. and 150° C. preferably between 0° C. and 50° C. with a ratio of onium halide monoalkyldihalide of 0.4 to 1 to 0.6 to 1.

The reaction may be conducted either in the presence of hydrocarbons such as hexane, n-heptane, benzene, toluene, xylene, etc. or by employing the pure compounds.

The transition metal halide is subsequently added, the monomer is introduced and the polymerization is started.

The polymerization can be carried out in the presence or in absence of a suitable solvent. It is possible to work at temperatures comprised between 0° and 150° C.

The following examples are given as illustrative but not limitative of the present invention.

*Example I*

10.3 cc. of monoethyl aluminum dichloride are reacted into a glass vessel at room temperature, under nitrogen, with 1.05 g. of trimethylsulphonium iodide in 50 cc. of toluene ($IS(CH_3)_3/Al(C_2H_5)Cl_2$ molar ratio=0.5). The product thus obtained is introduced under vacuum by syphoning into a 500-cc. autoclave kept at the constant temperature of 75° C.

1.5 g. violet $TiCl_3$ (alpha-modification) suspended in 150 cc. of toluene are then introduced into the autoclave.

Propylene is then introduced up to a pressure of 6 atmospheres.

After 10 hours, the polymerization is stopped. A crude polymer having a high crystallinity as demonstrated by X-ray examination and an intrinsic viscosity (determined in tetrahydronaphthalene at 135° C.) of 4.2, containing 0.7% of a product extractable with boiling ethyl ether, 1.5% of a product extractable with boiling n-heptane and 97.8% of isotactic polypropylene macromolecules (not extractable with boiling n-heptane) is obtained.

*Example II*

1.3 cc. of monoethyl aluminum dichloride in 50 cc. of n-heptane are reacted with 2.33 g. of tetrabutylammonium iodide ($IN(C_4H_9)_4/Al(C_2H_5)Cl_2$ molar ratio=0.5) according to the procedure shown in Example I.

The product thus obtained is introduced by syphoning under vacuum into a 500-cc. autoclave kept at the constant temperature of 75° C. 1.95 g. of violet titanium trichloride (alpha-modification) suspended in 150 cc. of toluene are then introduced into the autoclave.

Propylene is then introduced up to a pressure of 8 atm. After 5 hours, the polymerization is stopped. A crude polymer having a high crystallinity by X-ray examination and an intrinsic viscosity of 1.22 (measured in tetra-hydronaphthalene at 135° C.), containing 1% of a product extractable with boiling ethyl ether, 4.7% of a product extractable with boiling n-heptane and 94.3% of isotactic propylene macromolecules (not extractable with boiling n-heptane) is obtained.

All the separated fractions appear to be crystalline by X-ray examination. In particular, the crystallinity of the residue polymer is very high. Upon operating with molar ratios of tetrabutylammonium iodide to monoethyl aluminum dichloride of 0.7 to 1 and 1 to 1 no polymer is obtained.

*Example III*

0.54 cc. of monoethyl aluminum dichloride in 50 cc. of n-heptane are reacted with 1 g. of tetrabutylphosphonium iodide ($IP(C_4H_9)_4/Al(C_2H_5)Cl_2$ molar ratio=0.5) according to the method shown in Example I. The product obtained is introduced by syphoning under vacuum into a 500-cc. autoclave kept at the constant temperature of 75° C. 0.8 g. of violet $TiCl_3$ (gamma-modification), suspended in 200 cc. toluene, are then introduced into the autoclave.

Propylene is then introduced up to a pressure of 7 atmospheres.

After 10 hours, the polymerization is stopped. A polymer having a high crystallinity as demonstrated by X-ray examination and an intrinsic viscosity of 9.2 (measured in tetrahydronaphthalene at 135° C.) is obtained.

Said polymer contains 0.5% of a product extractable with boiling ethyl ether, 2% of product extractable with boiling n-heptane and 97.5% of isotactic polypropylene macromolecules (not extractable with boiling n-heptane).

*Example IV*

0.57 cc. of monoethyl aluminum dibromide in 50 cc. of toluene are reacted with 0.96 g. of tetrabutylammonium iodide ($IN(C_4H_9)_4/Al(C_2H_5)Br_2$ molar ratio=0.5) according to the method of Example I. The product obtained is introduced by syphoning under vacuum into a 500-cc. autoclave kept at the constant temperature of 75° C.

0.8 g. of violet titanium trichloride (gamma-modification) suspended in 200 cc. of toluene are then introduced into the autoclave.

Propylene is then introduced up to a pressure of 6 atm. After 18 hours, the polymerization is stopped. A polymer having an intrinsic viscosity (measured in tetrahydronaphthalene at 135° C.) equal to 5.5, containing only traces of a product extractable with boiling ethyl ether, only traces of a product extractable with boiling n-heptane and about 100% of isotactic polypropylene macromolecules (not extractable with boiling n-heptane) is obtained.

*Example V*

0.95 cc. of monoethyl aluminum dibromide in 60 cc. of toluene are reacted with 1.48 g. tetrabutylammonium-bromide ($[N(C_4H_9)_4]Br/AlC_2H_5Br_2$ molar ratio=0.5) according to the methods shown in Example IV.

The product obtained is introduced by syphoning under vacuum into a 500-cc. autoclave kept at the constant temperature of 75° C. 0.8 g. of violet $TiCl_3$ (alpha-modification), suspended in 100 cc. of toluene, are then introduced into the autoclave.

Propylene is then inroduced up to a pressure of 6 atm. After 15 hours, the polymerization is stopped. A polymer having a high crystallinity, as demonstrated by X-ray examination, an intrinsic viscosity of 3.8 (measured in tetra-hydronaphthalene at 135° C.) and containing 0.9% of a product extractable with boiling ethyl ether, 2.5% of a product extractable with boiling n-heptane and 96.6% of isotactic polypropylene macromolecules (not extractable with boiling n-heptane) is obtained.

*Example VI*

According to the modalities of the preceding example, 60 cc. of toluene, 1.1 cc. of $Al(C_2H_5)Cl_2$ and 0.596 g. of $(CH_3)_4NCl$ (Al/N molar ratio=2) are reacted.

The product obtained is introduced by syphoning under vacuum into a 500-cc. autoclave kept at the constant temperature of 75° C.

0.4 g. of violet $TiCl_3$ (α-modification containing 4.5% of Al as $AlC_3$ in solid solution, and then dry ground to a very fine powder) suspended in 140 cc. of toluene are then introduced into the autoclave and propylene is added up to a pressure of 2 atm. After 3 hours and 30 minutes during which the pressure is kept constant by feeding propylene, 15 g. of isotactic polymer having an intrinsic viscosity (determined in tetrahydronaphthalene at 135° C.) of 3.2 and containing 3.4% of product extractable with ethyl ether at the boiling point, 1.7% of product extractable with n-heptane at the boiling point and 94.9% of isotactic polypropylene macromolecules (not extractable with boiling n-heptane) are obtained.

*Example VII*

3 cc. of monoethyl aluminum diiodide in 100 cc. of toluene are reacted with 4.11 g. of tetrabutylammonium iodide. The product obtained is introduced by siphoning water under vacuum into a 1-litre autoclave kept at 15° C.

2 g. of violet $TiCl_3$ containing $AlCl_3$ in solid solution (obtained by reducing $TiCl_4$ with metallic Al and then finely grinding the dry product obtained) suspended in 400 cc. of toluene are then introduced into the autoclave.

Propylene is introduced up to a pressure of 6 atm. After 80 hours 220 g. of a polymer consisting of 100% of isotactic polypropylene macromolecules (insoluble in boiling n-heptane) and having an intrinsic viscosity (determined in tetrahydronaphthalene at 135° C.) of 9.3 are obtained.

Example VIII

Several polymerization runs were carried out with propylene, using catalysts consisting of 0.002 mol of violet $TiCl_3$ (gamma modification) and of the products obtained by reacting (as described) 0.008 mol of a compound of the type $AlRX_2$ (in which R is an alkyl, aryl or aralkyl group and X is a halogen) with 0.004 mol of an "onium" halide.

The polymerization runs were carried out in 200 cc. of toluene or n-heptane at 70° C. under pressure of 3 atm.

In Table 1 are reported the organometallic compounds, the onium halides and the solvents used, as well as the index of isotacticity of the polymers obtained, expressed as percent proportion of polymer insoluble in boiling n-heptane.

TABLE 1

| Run | $AlRX_2$ | Onium halide | Solvent | Polymer insoluble in boiling n-heptane, percent |
|---|---|---|---|---|
| 1 | $Al(CH_3)Cl_2$ | $(C_2H_5)_3SI$ | n-Heptane | 98 |
| 2 | $Al(CH_3)Br_2$ | $(C_3H_7)_4P\ Br$ | Toluene | 96 |
| 3 | $Al(iC_4H_9)Cl_2$ | $(CH_3)_4NI$ | do | 95 |
| 4 | $Al(nC_4H_9)Br_2$ | $(C_3H_7)_4NI$ | n-Heptane | 93 |
| 5 | $Al(C_6H_{13})Cl_2$ | $(C_2H_5)_4N\ Br$ | Toluene | 93 |
| 6 | $Al(C_5H_{11})Cl_2$ | $(CH_3)_4NCl$ | do | 89 |
| 7 | $Al(CH_3)I_2$ | $(C_5H_{11})_4NI$ | do | 98 |
| 8 | $Al(C_6H_5)Cl_2$ | $(CH_3)_4NI$ | do | 80 |
| 9 | $Al(C_7H_7)Cl_2$ | $(CH_3)_3SI$ | do | 85 |

Polymerization runs carried out with the aforesaid catalytic systems, but with other olefins instead of propylene, give highly isotactic polymers. For instance, by operating with butene-1, polymers which are almost completely insoluble in ether and contain fractions insoluble in n-hexane at its boiling temperature are obtained.

Many modifications and variations can be practiced without departing from the scope of the present invention.

It is to be understood that it is not intended to limit the scope of the present invention except as defined in the appended claims.

What we claim is:

1. The process for polymerizing a higher alpha-olefin selected from the group consisting of propylene and butene-1 to a polymerizate having a high content of isotactic macromolecules, which process comprises contacting the alpha-olefin, under polymerization conditions, with a catalytic system obtained by contacting a substance consisting of a monoalkyl aluminum dihalide with an onium halide selected from the group consisting of tetra-alkylammonium halides, tetra-alkylphosphonium halides, and trialkylsulfonium halides, in a molar ratio of from 1:0.4 to 1:0.6, and mixing the reaction product thus obtained with a transition metal compound selected from the group consisting of violet crystalline titanium trichloride and mixtures thereof with aluminum chloride.

2. A process according to claim 1, characterized in that the alpha-olefin is propylene.

3. A process according to claim 1, characterized in that the alpha-olefin is butene-1.

4. The process according to claim 1, characterized in that the monoalkyl aluminum dihalide contacted with the onium halide, in the preparation of the catalyst, is monoethyl aluminum dichloride.

5. The process according to claim 1, characterized in that the monoalkyl aluminum dihalide contacted with the onium halide, in the preparation of the catalyst, is monoethyl aluminum bromide.

6. The process according to claim 1, characterized in that the monoalkyl aluminum dihalide contacted with the onium halide, in the preparation of the catalyst, is monoethyl aluminum diiodide.

7. The process according to claim 1, characterized in that the onium halide contacted with the monoalkyl aluminum dihalide, in the preparation of the catalyst, is trimethylsulfonium iodide.

8. The process according to claim 1, characterized in that the onium halide contacted with the monoalkyl aluminum dihalide is tetrabutylammonium iodide.

9. The process according to claim 1, characterized in that the onium halide contacted with the monoalkyl aluminum dihalide is tetrabutylphosphonium iodide.

10. The process according to claim 1, characterized in that the onium halide contacted with the monoalkyl aluminum dihalide is tetrabutylammonium bromide.

References Cited by the Examiner

UNITED STATES PATENTS

| 2,886,561 | 8/1956 | Reynolds et al. | 260—94.9 |
| 2,912,424 | 11/1959 | Cash | 260—94.9 |

FOREIGN PATENTS

| 570,168 | 2/1959 | Belgium. |
| 554,242 | 2/1957 | Belgium. |
| 779,540 | 7/1957 | Great Britain. |

JOSEPH L. SCHOFER, *Primary Examiner.*

J. GOTTS, *Examiner.*

M. B. KURTZMAN, E. L. ROBERTS,
*Assistant Examiners.*